(12) United States Patent
Robison

(10) Patent No.: US 11,405,402 B2
(45) Date of Patent: Aug. 2, 2022

(54) SYSTEM AND METHOD FOR IMPLEMENTING A COMPUTER NETWORK

(71) Applicant: BLOCKCHAIN IT SOLUTIONS PTY LTD, New South Wales (AU)

(72) Inventor: Zackery Robison, Hornsby (AU)

(73) Assignee: BLOCKCHAIN IT SOLUTIONS PTY LTD, New South Wales (AU)

( * ) Notice: Subject to any disclaimer, the term of this patent is extended or adjusted under 35 U.S.C. 154(b) by 225 days.

(21) Appl. No.: 16/955,573

(22) PCT Filed: Dec. 19, 2018

(86) PCT No.: PCT/AU2018/051355
§ 371 (c)(1),
(2) Date: Jun. 18, 2020

(87) PCT Pub. No.: WO2019/119034
PCT Pub. Date: Jun. 27, 2019

(65) Prior Publication Data
US 2020/0344240 A1    Oct. 29, 2020

(30) Foreign Application Priority Data
Dec. 19, 2017   (AU) .............................. 2017905067

(51) Int. Cl.
*H04L 9/40* (2022.01)
*G06F 16/27* (2019.01)
(Continued)

(52) U.S. Cl.
CPC ........ *H04L 63/102* (2013.01); *G06F 16/2379* (2019.01); *G06F 16/27* (2019.01);
(Continued)

(58) Field of Classification Search
CPC . H04L 63/102; H04L 9/0637; H04L 2209/38; H04L 9/0891; H04L 9/3247;
(Continued)

(56) References Cited

U.S. PATENT DOCUMENTS 11,281,751 B2 *   3/2022   Salomon ............... H04L 9/3263
2016/0028552 A1   1/2016   Spanos et al.
(Continued)

FOREIGN PATENT DOCUMENTS

WO   WO-2016128491 A1   8/2016
WO   WO-2017136956 A1   8/2017

OTHER PUBLICATIONS

Bandara, H. M. N., and Anura P. Jayasumana. "Collaborative applications over peer-to-peer systems—challenges and solutions." Peer-to-Peer Networking and Applications 6.3 (2013): 257-276. (Year: 2013).*

(Continued)

*Primary Examiner* — Michael R Vaughan
(74) *Attorney, Agent, or Firm* — Harness, Dickey & Pierce, P.L.C.

(57) ABSTRACT

A method for implementing a private computer network over which digital assets can be securely managed, the method comprising: implementing an autonomous network agent on each of a plurality of network devices that are communicable over a digital communications medium, the autonomous network agent being operable to execute a network program that is embodied as program code in a blockchain that is stored and synchronised by the respective network devices, the network program defining permissible network defined digital asset types and corresponding functions.

12 Claims, 13 Drawing Sheets

(51) Int. Cl.
*G06F 16/23* (2019.01)
*G06F 21/62* (2013.01)
*H04L 9/06* (2006.01)
*H04L 9/00* (2022.01)

(52) U.S. Cl.
CPC ........ *G06F 21/6218* (2013.01); *H04L 9/0637* (2013.01); *H04L 9/50* (2022.05)

(58) Field of Classification Search
CPC ......... H04L 67/34; H04L 9/12; H04L 9/3239; H04L 9/3297; G06F 16/2379; G06F 16/27; G06F 21/6218; G06F 21/64; G06F 21/12; G06F 2221/2141; G06Q 90/00
See application file for complete search history.

(56) References Cited

U.S. PATENT DOCUMENTS

| | | |
|---|---|---|
| 2017/0046638 A1 | 2/2017 | Chan et al. |
| 2017/0287090 A1 | 10/2017 | Hunn et al. |
| 2018/0039667 A1* | 2/2018 | Pierce .................... G06Q 40/04 |
| 2018/0260212 A1* | 9/2018 | Wisnovsky ............... G06F 8/71 |
| 2019/0020648 A1* | 1/2019 | Haque .................... G06F 16/27 |

OTHER PUBLICATIONS

International Search Report and Written Opinion of the International Searching Authority, issued in PCT/AU2018/051355, dated Mar. 21, 2019; ISA/AU.
International Preliminary Report On Patentability of the International Searching Authority, issued in PCT/AU2018/051355 dated Sep. 20, 2019.
Examination Report for corresponding Indian patent application No. 202027026545 dated Apr. 27, 2022, 10 pages.

* cited by examiner

SYSTEM AND METHOD FOR IMPLEMENTING A COMPUTER NETWORK

CROSS-REFERENCE TO RELATED APPLICATIONS

This application is a 371 U.S. National Phase of International Application No. PCT/AU2018/051335, filed Dec. 19, 2018, which claims priority to Australian Patent Application No. 2017905067, filed Dec. 19, 2017. The entire disclosures of the above applications are incorporated herein by reference.

FIELD OF THE INVENTION

The present invention relates generally to a system and method for the secure management, storage and access of digital assets over a computer network.

BACKGROUND OF THE INVENTION

Conventional blockchain systems typically comprise three blockchain components, namely the consensus protocol; transactional state; and application (also commonly referred to as a "node application").

The consensus protocol is a means for network devices to synchronise on the same transactional state. The transactional state is a representation of the current state of the system. This is usually a form of transaction of authority from a pseudonym to another using a smart contract that programs the rules for said transaction. Finally, the application takes the form of a program that makes changes to and interprets the transactional state to achieve its purpose.

The consensus protocol and transactional state usually are general purpose implementations with minor tweaks depending on the deployment. The main functionality of a conventional blockchain system comes from the smart contracts and the application's interpretation of data on the blockchain.

Smart contracts, depending on the implemented language, allow for almost any functionality. This means that every and any user of the system can define their own rules over the digit asset within the limits of the application and data on the blockchain. This makes it infeasible to verify all different contracts created, and may give individual users undefined/unwanted control within the system. This becomes a major limiting factor in the creation of safety critical systems, or systems employed by entities that hold some duty of care of the correctness, security and safety of the employed system.

SUMMARY OF THE INVENTION

In accordance with a first aspect of the invention there is provided a method for implementing a network, comprising: storing a network program as program code in a root block of a blockchain, the network program defining: (a) one or more rules for creating a structured network of network devices, each network device implementing an autonomous network agent for executing the network program; (b) one or more permissible digital asset types; and (c) one or more functions that can be performed on the permissible digital asset types; and executing the network program by the autonomous network agent on each network device to implement the network.

In an embodiment the step of configuring the network comprises initially executing the network program by an authorised one of the network devices, thereby causing the blockchain to be distributed to each of the other network devices.

In an embodiment, once a network device has received the blockchain, the corresponding autonomous agent structures the network device within the network in accordance with the one or more rules.

In an embodiment the blockchain is implemented by the network devices to validate device and/or user-initiated requests placed over the network and received by the corresponding network agent.

In an embodiment the network program defines one or more permissions that need to be satisfied as part of the validation.

In an embodiment, in response to a network request being validated, the method further comprising updating the network.

In an embodiment one of the digital asset types enables an authorised user to call a function that changes and/or updates the network program.

In an embodiment updating the network comprises adding a new block to the blockchain that is representative of at least one request that has been validated.

In accordance with a second aspect there is provided a computer implemented method for securely managing both devices that operate within a network, as well as digital assets stored thereon, the method comprising: implementing a network program that operates over the network and which is executable to synchronise and interface with a blockchain, and wherein an initial version of the network program is stored in a root block of the blockchain that is distributed among the devices.

In an embodiment the network program is executed by autonomous network agents that operate on the devices.

In an embodiment the method further comprises updating the network program in response to the autonomous network agents unanimously agreeing to the update.

In an embodiment data representative updates to the network program is stored in blocks that are added to the blockchain In accordance with a third aspect there is provided a system for implementing a private computer network over which digital assets can be securely managed, the system comprising: a plurality of network devices that are communicable over a digital communications medium, each of the network devices implementing an autonomous network agent that is operable to execute a network program that is embodied as program code in a blockchain that is stored and synchronised by the respective network devices, the network program defining one or more permissions for validating network requests posted over the network by the network devices.

In accordance with a fourth aspect there is provided a method for implementing a private computer network over which digital assets can be securely managed, the method comprising: a network creation phase comprising: installing an autonomous network agent on each of a plurality of computing devices that are to initially form the private computer network; associating each of the plurality of computing devices with at least one other of the computing devices thereby creating computing device peers, based on one or more peer creation rules; generating a root block of a blockchain and synchronising the root block between each of the plurality of computing devices, the blockchain storing one or more request validation permissions and one or more security criterion; a network implementation phase comprising: receiving a device instruction via one of the computing devices, the device instruction causing the corresponding device to post a peer request message to the network, the peer request message including: a unique identifier for the posting computing device; and a device request relating to a digital asset; forwarding the peer requesting message over the network to at least one peer computing device for validation, the validation being carried out by the corresponding autonomous agent based on an evaluation of the permissions stored by the blockchain; and executing the device request responsive to validating the peer request message; and updating a state of the network based on the processed request, provided that each of the one or more security criterion defined by the blockchain have been satisfied.

In an embodiment the state update comprises adding a block to the blockchain, the block including data representative of the processed device request.

In an embodiment the state update further comprises synchronising the modified blockchain between each of the plurality of computing devices.

In an embodiment the step of adding a block comprises one of the computing devices solving a maths based puzzle that takes into consideration: (a) a reference to a previously solved puzzle; (b) an identifier for at least one peer computing device; and (c) a reference to the processed device request(s).

In an embodiment the security criterion takes into consideration at least one of the following: (a) a hash rate; and (b) a number of times that one of the computing devices has solved the maths based puzzle.

In an embodiment the one or more request validation permissions and one or more security criterion are defined by program code that is evaluated by the autonomous agent.

In an embodiment the network implementation phase further comprises one or more non-peer computing devices forwarding the peer request message to the selected one or more peer computing devices.

In an embodiment the one or more predefined permissions are evaluated by each of the one or more non-peer computing devices that receive the peer request message.

In an embodiment one of the predefined permissions is that the posting computing device is authorised to access the private network.

In an embodiment the peer request message is generated based on a user instruction entered by a user on the posting computing device and wherein the peer request message further includes a unique identifier for the user.

In an embodiment a second one of the predefined permissions is that the user associated with the unique identifier is authorised to use the posting computer device.

In an embodiment the device request includes a device instruction to perform a specified function on a specified type of digital asset.

In an embodiment the function comprises on or more of the following: store data of the specified digital asset type on the at least one peer computing device, modify data of the specified digital asset type stored on the at least one peer computing device; or retrieve data of the specified digital asset type stored on the at least one peer computing device.

In an embodiment a third of the predefined permissions is that the user associated with the unique identifier is authorised to instruct the one or more peer computing devices to perform the specified function on the specified digital asset type.

In an embodiment a fourth of the predefined permissions is that the user associated with the unique identifier is authorised to instruct the one or more peer computing devices to perform the specified function on the specified digital asset type on the posting computing device.

In an embodiment the specified function is entered by the user via a user interface that is communicable with the network program on the corresponding computing device over a local port.

In an embodiment the user interface prevents the user from specifying a function that they are not authorised to access.

In an embodiment the peer request message is generated independently of a user instruction and wherein the device request includes one or more of the following: an instruction to connect to one or more peer devices; an instruction to query the health of any digital assets held by the device In an embodiment during the network creation phase one of the computing devices is designated as a primary contact computing device and the remaining computing devices are designated as non-primary contact computing devices.

In an embodiment the primary contact computing device is responsible for generating the root block.

In an embodiment, once the root block has been generated, the autonomous agent on each non-primary computing device is configured to communicate with the autonomous agent on the primary computing device to synchronise the blockchains.

In an embodiment, once the root block has been synchronised, each of the autonomous agents create a network identifier for the corresponding computing device and wherein the peer creation rules determine which computing devices to associate with other computing devices based, at least in part, on the respective network identifiers.

In an embodiment the method further comprises registering encryption key sets for each of the plurality of computing devices and wherein public keys for each of the computing devices are recorded by the blockchain.

In an embodiment the method further comprises registering encryption key sets for each network user and wherein public keys for each of the computing devices are recorded by the blockchain.

In an embodiment the peer request message includes the public key for the device and/or network user and wherein the device request is processed utilising the public key.

In an embodiment the autonomous agent on each of the computing devices stores a hash of the synchronised blockchain.

In an embodiment the peer request message includes the blockchain and wherein the peer computing devices forward the peer request message when the blockchain mirrors the stored version.

In an embodiment the method further comprises the step of instructing at least one of the computing devices to allocate space for storing at least one digital asset type.

In an embodiment the space is allocated to one or more users of the private network.

In an embodiment the step of instructing at least one of the computing devices to allocate space is performed during the network creation phase.

In accordance with a fifth aspect there is provided a system for implementing a private computer network over which digital assets can be securely managed, the system comprising: a plurality of network devices that are communicable over a digital communications medium, each of the network devices implementing an autonomous network agent that is operable to execute a network program that is embodied as program code in a blockchain that is stored and synchronised by the respective network devices, the network program defining permissible network defined digital asset types and corresponding functions.

In an embodiment the network devices are operable to post a peer request message over the network, the message including a request to perform a function on a particular digital asset type and wherein the network program on at least one peer network device automatically evaluates the network environment contained within the blockchain to establish whether the requested function is permissible for the particular digital asset type.

In an embodiment the network program on the at least one peer network device is further programmed to check that all appreciate authorisations for the request function have been satisfied.

In an embodiment, provided the request function is permissible and the appreciate authorisations have been satisfied, the at least one peer network device either executes the function or forwards the peer request message to a peer of that device, depending on whether the requested function can be performed by the at least one peer device.

In accordance with a sixth aspect there is provided a method for implementing a private computer network over which digital assets can be securely managed, the method comprising: implementing an autonomous network agent on each of a plurality of network devices that are communicable over a digital communications medium, the autonomous network agent being operable to execute a network program that is embodied as program code in a blockchain that is stored and synchronised by the respective network devices, the network program defining permissible network defined digital asset types and corresponding functions.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

Embodiments described herein relate a system and method that makes use of blockchain technology for securely managing both devices that operate within a network, as well as digital assets stored thereon. More particularly, the management of digital assets is facilitated by way of a network program that operates over the network and which synchronises and interfaces with the blockchain. In contrast to conventional blockchain systems, the network program is a part of the blockchain itself, rather than static software that is downloaded and installed on the network devices.

The term "digital assets" as used herein will be understood as referring to anything that can be represented digitally through data representations, or as interactions between one or more digital, physical or abstract concepts (i.e. that are represented digitally with some rights attached to them). Thus, embodiments described herein can be used to track, audit and manage anything that can be defined as a set of rules tied to some action. For example, a report can be represented as a PDF, which is a data representation. Access to a security door can be represented as a series of interactions (i.e. open or close, that can be represented in binary within the system). Thus, both reports and security doors can be represented as digital assets, according to embodiments described herein.

General System Configuration

Figure 1:
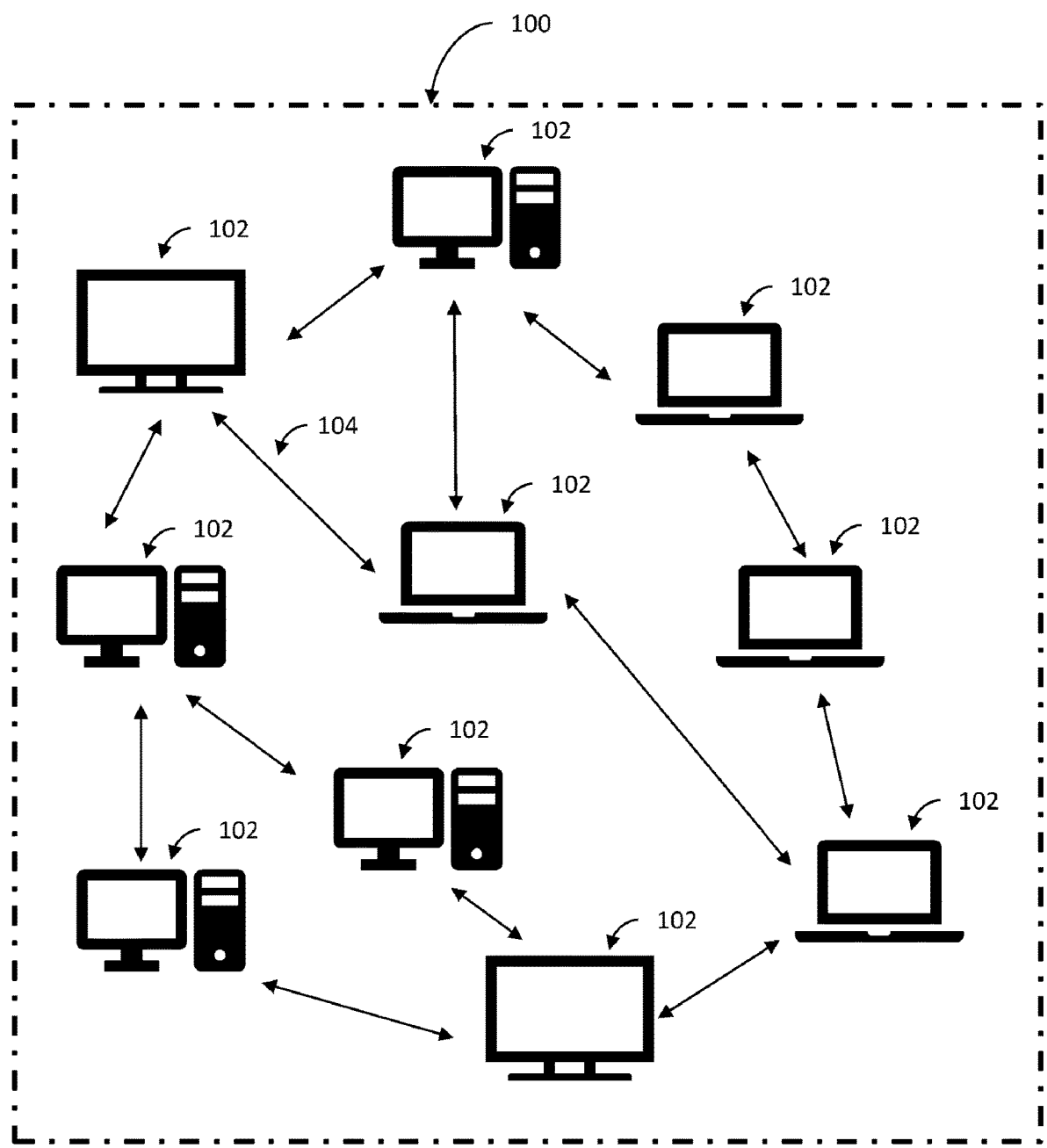
FIG. 1 is a schematic of an example physical network architecture for implementing a private network, in accordance with an embodiment of the present invention.

With reference to FIG. 1, there is shown an example computing network 100 suitable for implementing an embodiment of the present invention. The network 100 comprises a plurality of network devices 102. The network devices 102 are interconnected by a suitable form or medium of digital data communication, taking the form of a communication network. Examples of communication networks include a local area network (LAN), a wide area network (WAN), and the Internet. The communication network may be a fixed or wireless network, depending on the desired implementation.

It will be understood that the specific physical network configuration can take on any particular form, as required for the intended use. Devices 102 within the network are structured based on rules defined by the network program, as will be described in more detail in subsequent paragraphs. For example, the network program may require that the network be configured as a distributed hash table (DHT) based network, where devices 102 are grouped as peers. This is best shown in FIG. 1, where arrows 104 are used to illustrate the peer relationships.

Figure 2:
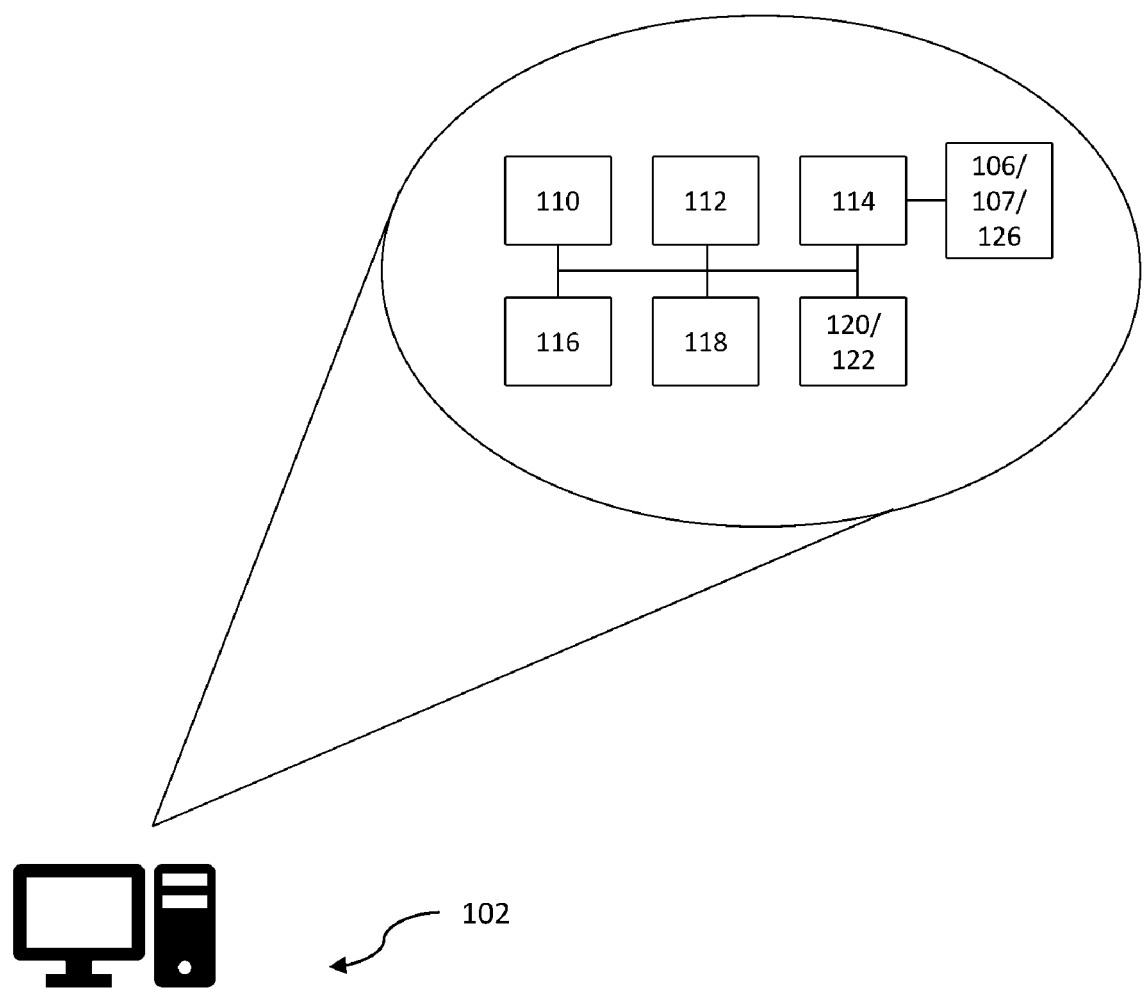
FIG. 2 is a schematic of an example network device, in accordance with an embodiment of the invention.

With additional reference to FIG. 2, the network devices 102 include a processor 110, memory 112, storage device 114, network device 116, and power supply 118. It will be understood that memory 112 stores data within the network device 102. In one implementation, memory 112 is a volatile memory unit or units. In another implementation, memory 112 is a non-volatile memory unit or units. Memory 112 can also be another form of computer-readable medium (e.g., a magnetic or optical disk). Memory 112 may be non-transitory.

The storage device 114 can be any suitable form of device capable of providing mass storage. In one implementation, the storage device 114 can be, or contain, a computer-readable medium (e.g., a hard disk device, a flash memory or other similar solid-state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer or machine-readable medium.

The processor 110 can execute instructions within the network device 102, including instructions stored in memory 112. The processor 110 can be implemented as a chipset of chips that include separate and multiple analogue and digital processors. The processor 110 can provide, for example, for coordination of the other components of device 102, e.g., control of user interfaces, applications run by device, and wireless communication by device 102.

The storage device 114 of each network device 102 is loaded with an agent in the form of an autonomous network agent 106 which, under the control of the processor 110, is operable to facilitate communication and blockchain synchronisation between the network devices 102. As will be described in more detail in subsequent paragraphs, the network agent 106 is operable to execute a network program 107 (referred to in preceding paragraphs) that is embodied as program code within a blockchain stored by the network devices 102. The network agent 106 may additionally be configured to process user instructions for application by the network program 107.

Some, or all, of the network devices 102 may include a display 120 and user interface 122 for receiving user instructions. It will be appreciated that the user interface 122 can take on any suitable form of interface for receiving a user instruction (e.g. mouse, keyboard, touch screen incorporated into the display 120, etc.).

It will be appreciated that the network devices 102 can be implemented in a variety of different forms. For example, the devices 102 could take the form of a general-purpose computer, server computer, special purpose device including a smart phone, tablet, Internet of Things (IoT) device, or the like. It will also be understood that the network 100 could comprise multiple different forms of network device 102. The components shown in FIGS. 1 and 2 and their connections and relationships, are meant to be examples only, and not meant to limit implementation of the techniques described herein.

Modified Blockchain

Conventional blockchain systems comprise three blockchain components, namely the consensus protocol; transactional state; and application (also commonly referred to as a "node application"). The consensus protocol is a means for network devices to synchronise on the same transactional state. The transactional state is a representation of the current state of the system. This is usually a form of transaction of authority from a pseudonym to another using a smart contract that programs the rules for said transaction. Finally, the application takes the form of a program that makes changes to and interprets the transactional state to achieve its purpose.

The consensus protocol and transactional state usually are general purpose implementations with minor tweaks depending on the deployment. The main functionality of a conventional blockchain system comes from the smart contracts and the application's interpretation of data on the block chain. More particularly, smart contracts employed by conventional blockchain systems are used to dictate the use/transfer of an asset and authorisation of their use.

In contrast, the network program 107 as described herein is employed to operate the network itself, including constructing the network structure, defining possible digital assets and allowing users/devices to interface with the network.

Embodiments described herein re-design the conventional blockchain system stack by distributing its functionality across all network devices 102 operating within the network 100. Importantly, the network program 107 (i.e. that operates over, synchronises and interface with the blockchain) is a part of the blockchain itself, rather than static software that is downloaded and installed. Thus, instead of viewing a blockchain as a data structure, it is instead applied as a distributed programming language, which operates over the network environment it is representing. The network program 107 will now be described in more detail.

Network Program

Figure 3:
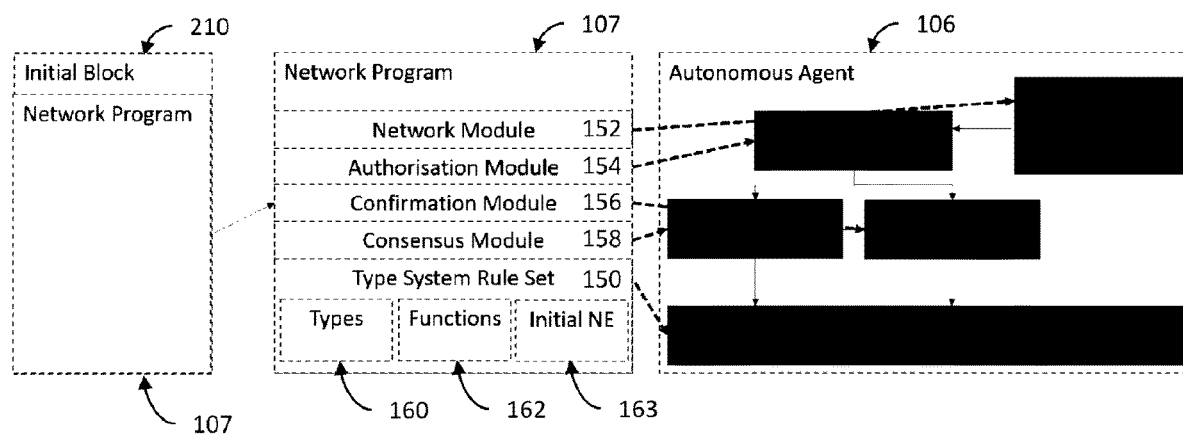
FIG. 3 is a schematic illustrating operation of the network program, in accordance with an embodiment.
Figure 4:
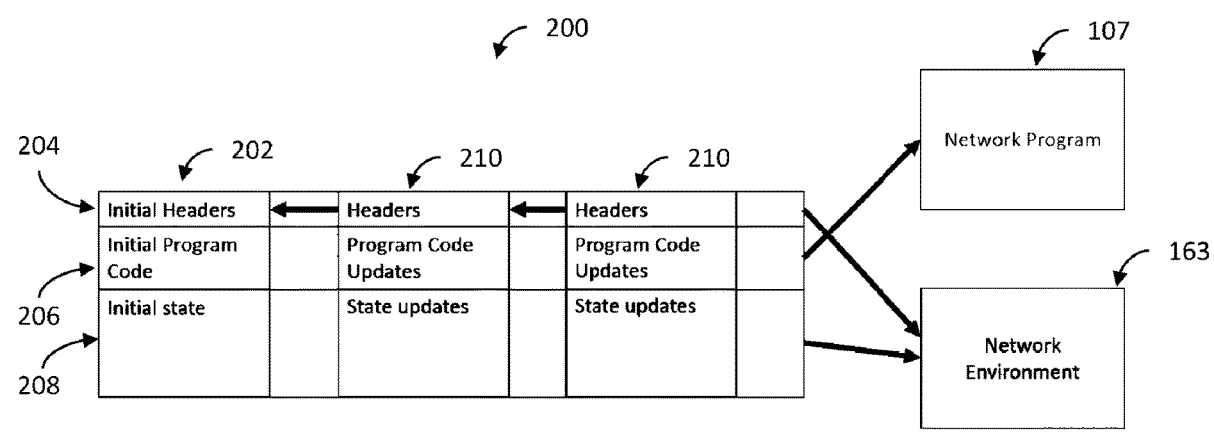
FIG. 4 is a schematic of a blockchain implementation, in accordance with an embodiment of the present invention.

With additional reference to FIGS. 3 and 4, the network program 107 is represented by program code 206 stored by the blockchain 200. The network program 107 is programmed to facilitate consortium-based control for network access.

The network program 107 is an implementation of the software used to process and interpret information on the blockchain 200 and, as mentioned above, is itself also stored on the blockchain 200. The network agent 106 is used as a framework to host the network program 107 for the purpose constructing a structured network environment, defining possible digital assets and allowing users/devices to interface with network. It will be understood that the boxes shown within the network agent 106 may be thought of as place holders. The network agent 106 implements a series of modules that the network program 107 provides during execution. The network agent 106 retrieves these modules from the network program 107 and binds them into place for operation.

As previously mentioned, the network program 107 specifies rules and modules required for execution to create the structured computer network. With additional reference to FIG. 3, the modules and rules for a particular embodiment comprise:

(a) a type system rule set 150, which describes all possible digital assets available in the system, the initial network environment and possible functions that can be performed;

(b) a network module 152 and corresponding network rules which are used to find peers and determine the structure of the network, as previously described with reference to FIG. 1;

(c) an authorisation module 154, which is responsible for authorising peer request messages;

(d) a confirmation module 156, which is responsible for queuing functions for execution; and (e) a consensus module 158 which is responsible for synchronising the blockchain 200 among peers.

The network program 107 also maintains a list of permissible digital asset types 160 and functions 162 that can be performed on the digital asset types 160. The network agent 106 finds the necessary modules 152 to 158 and rules 150 and binds them into place for operation on the network, as illustrated in FIG. 3.

With particular reference to FIG. 4, the blockchain 200 comprises a root block 202 consisting of initial headers 204, initial program code 206 (i.e. representative of an initial version of the network program 107) and an initial state 208 (i.e. that defines the starting state for the digital assets to be stored/managed). This is represented in FIG. 3 as the "initial NE" 163.

Requests placed over the network 100 can take the form of device initiated requests (e.g. forward an instruction to a peer network device, connect to more or different peer network devices, query the health of any digital assets held by a network device, etc.) and user initiated requests (e.g. to store or access a specific digital asset, to cast a vote, etc.).

Digital assets 109 in the network 100 may be represented as arbitrary tokens that are associated with storage space that has a particular state.

The blockchain 200 is implemented by the various network devices 102 to validate each network request that the corresponding network agent 106 receives (i.e. either for on-forwarding or direct execution). According to a particular embodiment, validation can be broken down into four distinct permission groups (i.e. as specified by the functions 162 and the authorisation module 154 implemented by the network program 107):

(a) functions that only network devices 107 can do (e.g. sync and store);
(b) functions that individual users are authorised to do;
(c) functions that individual network devices can do when used by a particular user, and
(d) what users are allowed on what network device.

For each network request, each permission group must be satisfied.

The network headers 204 are evaluated in the physical layer of the network and are found in every block 202/210 on the blockchain 200. The headers 204 may include, but are not limited to: time, a reference to the previous block, a reference to state updates 208 and program code 206, the consensus protocol mechanism (i.e. proof of work, such as a solution to some moderately hard puzzle), reference to the public key for the network device 102 that created the block 210 and a digital signature created using a private key that corresponds to the public key of the network device 102 that created the block 210. The time indicates the time or timeframe the block 210 is representing. The reference to the previous block 210 indicates the position in the blockchain 200 of the block 210 holding the headers 204 (with a means for validating, such as a hash).

The reference to the state updates 208 and program code 206 are evaluated by the consensus module 158 of the network program 107 to determine the order in which the updates occurred and the specified time or time frame of the occurrence. The consensus module 158 is responsible for creating additional blocks within the system and placing references to state updates within each block. The consensus protocol mechanism is the data used by the consensus module 158 to verify the block's validity. The reference to the public key of the creating device and corresponding signature are used the verify that the creating device is authorised the create a block.

Depending on the network request, either the network environment (i.e. the state of the network and digital assets maintained thereby) may need to be updated to reflect that there has been a change of state for a particular one or more tokens (i.e. that are representative of some digital asset), or the network program 107 itself (i.e. and more particularly the program code 206) updated to reflect updates to the network rules. As described herein, the phrase "updating the network" refers to the process of synchronising the blockchain among network devices 102 (i.e. such that each network device 102 references and queues the execution for peer request messages based on the same network state). For example, a network update of the network environment would be required when ownership of a digital asset changes from one user to another. Similarly, the network would need to be updated if the contents of a digital asset had been modified. It will be understood that the criteria for updating the state of the network may vary depending on the specific implementation. These criteria are included in the program code 206 that is stored by the blockchain 200. An example of a network update of the program code 206 would be required when changing registers of allowed devices and users, or adding or altering usable digital asset types within the network.

Figure 5:
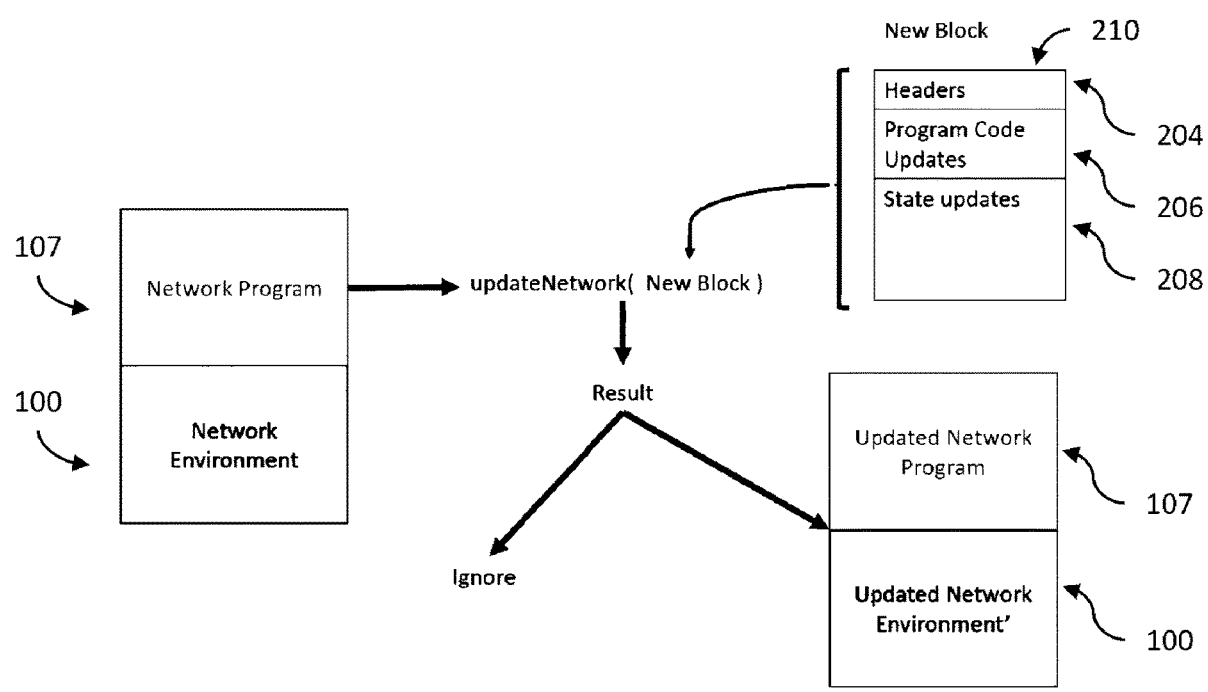
FIG. 5 is a schematic illustrating how the network environment is updated, in accordance with an embodiment.

In general terms, the network is updated by adding a new block 210 to the blockchain 200, whereby the newly added block 210 includes data that is representative of what network requests have been received and validated. A block can update either or both the network environment and the network program 107. This process is schematically illustrated in FIG. 5 and is carried out by the consensus module 158 implemented by the network programs 107 on each network device 102.

A block 210 is created by creating the headers 204. Once the block 210 is created, the network device 102 that created the block 210 sends it to its peers. As will be discussed in more detail in subsequent paragraphs, the network program 107 and network environment 100 provides a means to verify an incoming block 210. If the block 210 can be verified, then it is "accepted" by the receiving network devices 102 and their respective peers. If the block 210 is unable to be verified, then it is ignored. Once the block 210 has been accepted it is attached to the blockchain 200 stored by the accepting devices 102 and the network program and/or network environment are updated to reflect changes indicated within the newly added block 210.

Once a majority of the network devices 102 on the network have accepted the newly created block 210, the network is considered to be "synchronised". In other words, "synchronisation" occurs when a majority of network devices 102 agree on the same network environment 100 and program 107. Once the network is synchronised with a new block, the state changes and the function that they represent are queued to execute on the network devices 102.

The network can become unsynchronised in two ways. Either a block 210 has been created and it has not yet been accepted by the majority of network devices 102, or a fork in the blockchain 200 has occurred. A fork in the blockchain 200 occurs when two blocks 210 are created that contain the same reference to the previous block 210. A method for fork resolution is provided by the consensus module 158 and can be adjusted to meet the requirements of the specific implementation. An example of a method for fork resolution is to accept a side of the fork, depending on which one was the most difficult to create computationally.

As previously stated, the network program 107 allows users to define peer rules describing how to group the network devices 102 into a set of structured peers. According to the illustrated embodiment, the basic network peer rules are implemented using a distributed hash table (DHT) system, whereby network devices 102 are assigned identifiers based on peer rules that specify what digital assets they store/maintain. By way of example, a network device's identifier (ID) may be created through the hash of a reference to the latest block created and communication protocol details of how to establish a connection with the network device 102. By way of another example, individual network devices 102 may be specified static IDs that can be specified/changed by the users. As will become evident from subsequent paragraphs, peer rules are defined as a function within the network program 107 that allow the specification of a network configuration with desired security criterion and functionality.

Embodiments described herein advantageously allow users to define owners of the network that can update, change or remove any part of the network program 107, including how the network operates, any or all its modules 1520 to 158, rules 150, types 160 and functions 162, or any part of the execution and structure of the computer network the user sees fit. Embodiments described herein allow the user to do this without software updates, without possibility for forks, without need for external update distribution and without restating the network. At the same time, the network remains back-compatible with network devices 107 that are un-synchronised and all changes that are made are recorded and tracked.

In more detail, the afore-described modules 152 to 154, rules 150 and functions 160 implemented by the network program 107 are considered as special forms of digital assets; or rather higher order digital assets. Thus, all parts of the network program 107 have the same properties as standard digital assets within the system; that is, they have an owner, they have a type and they have functions that can be used on them. The owner is used to specify who owns the network program 107 by stating the permissions needed to change parts thereof. The type 160 allows the network agent 106 to map and execute these digital assets. The functions 162 allow and specify possible alterations and changes that can occur to the network program 107. This allows users who have ownership over the core modules 152 to 158, rules 150 and functions 160 to make changes to them on the fly.

It is possible to have a function 160 in the network program 107 that allows the addition of more functions. This means that any update to any part of the network program 107, large or small, can be added as a function, then that function executed to make the change. As such all changes can be made on the fly without interrupting any part of the network itself. These changes are recorded in the same way other "normal" function on the blockchain 200. This means the blockchain 200 records not only the history and current state for all standard digital assets, but also the history and current version of the network program 107.

The network program 107 contained within the blockchain 200 defines permissible network defined types and corresponding functions. When a network update is requested, the network program 107 on validating network devices 102 will evaluate the network environment contained within the blockchain 200 to establish whether the requested function is permissible for the associated digital asset type and all appreciate authorisations have been satisfied that is required by the requested function.

Thus, in contrast to convention smart contract based blockchain systems, it is not possible for users to create their own smart contracts; instead embodiments described herein ensure that users can only call permissible functions on digital asset types that they have ownership or authorisation over, as defined by the network program 107.

In a particular embodiment, each function 162 contains the following four parts:
(a) input types;
(b) authorisation executable;
(c) functionality executable; and
(d) return type.

The input types describe what types of digital assets are required for this function. The authorisation executable is a part of the function that is executable to determine if the function is valid in terms of rules set out by the network program 107, or further custom rules. The functionality executable defines the action that is to be carried out. When a function is "executed", it has passed the authorisation test and the functionality executable is executed. The return type determines the type of digital asset that is the result of the action. For example, in a simple currency-based system, the input types would be a coin, and the return types would be coin. The authorised executable will check that this transfer of coin is allowed. The functionality executable will change the owner of the coin. In a more complex example, an "AppendToLog" function would use an asset of type "log" and an asset of type "storage space" and return an asset of "type log". The authorised executable would check if the user has write access to the log, and that there is enough space given to attach the information. The functionality executable would append something to the log.

It will be understood that users can define their own digital asset types 160 and permissible functions 162. By way of example, a user-defined digital asset type may be "data" and the functions that can be performed on that asset type may include read, store or modify. By way of another example, the digital asset type may be "vote type" for a given subject and the functions that can be performed are "yes" or "no". This could enable users to vote, for example at a board meeting, on a particular subject at a given time during the meeting. An additional example includes defining "relational data" or "composite data" types. This involves having arbitrary sources of data that includes links to other arbitrary sources of data. The functions performed includes retrieve access parts or all of linked data, check facts about linked data and verify ownership of data, or use computational resources in some way. This could enable users to create arbitrary pieces of data that can allow access or use of other arbitrary pieces of data. This could enable users to create relations between data, such as a person's digital identity which can linked to other information such as medical history, personal information or deeds of ownership. A more advanced example includes creating digital asset types to recursively define "sub-private networks" or "hierarchical private networks" that can be used within the current network program 107. This digital asset type can be used to create entire new blockchains 200 with their own (or shared) network programs 107 and network environments 100. Functions performed over this type may be to join or listen to the network. This may enable network users to separate network needs across different sub-networks, or create different levels of networks with different permissions, digital asset types and security, such as a public level, confidential level and secret level.

User Interface

User initiated network requests are entered by way of a user application interface 126. In a particular embodiment, the user application interface 126 takes the form of a browser-based application that is communicable with the network program 107 over a local port. Other embodiments may rely on specialised persistent applications installed on the user's network device 102. The browser-based application is loaded on the storage device 114 and allows users to request particular functions for particular digital assets. The application interface 126 is communicable with the network program 107 to generate a peer request message from the input information, that is subsequently sent over the network the relevant network peer device(s) 102.

Network Creation Phase

The process for creating a private network as described herein will now be detailed with reference to FIG. 6. It will be understood that a private network is a network used by devices/users for their exclusive use and whereby only devices/users with permission can join the private network.

Figure 6:
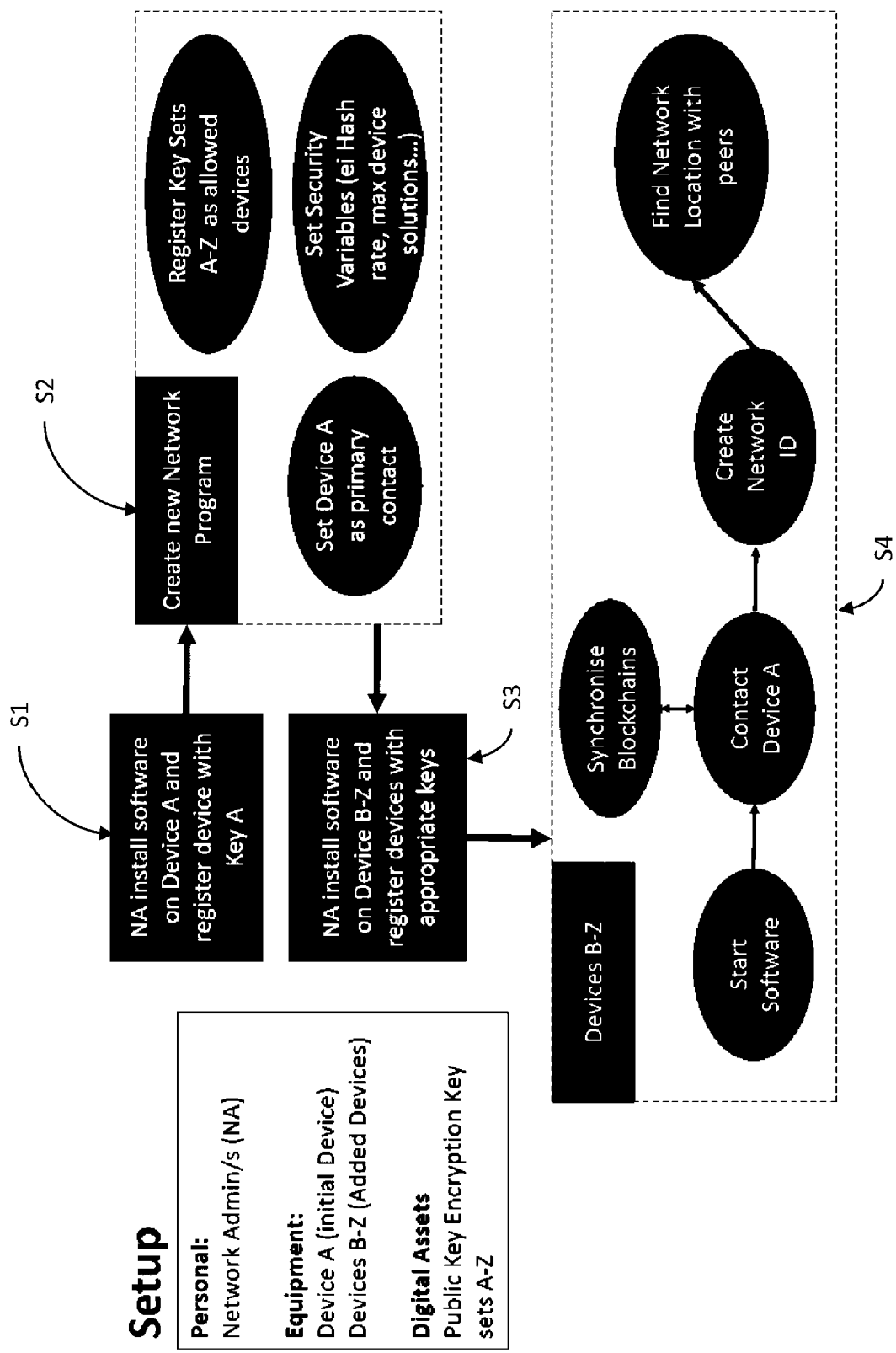
FIG. 6 is a schematic illustrating an example process for creating a network, in accordance with an embodiment.

At step S1, the autonomous network agent 106 (defined by programmable software) is installed by a network administrator on an initiating network device 102 (referenced as "Device A" in FIG. 6).

At step S2, a network administrator programs the network agent 106 to create a new network program 107. In an embodiment, creating the network program 107 comprises programming the various modules 152 to 158, rule sets 150, types 160 and functions 162 as previously described. In more detail, this may include specifying a primary contact network device (in this example "Device A", though it will be understood that more than one device may be designated as a primary contact device, depending on the desired implementation), a register of the public keys of allowed users and network devices 102, register of permissions for users and network devices 102 (the four indicated in above paragraphs), definition of at least one network asset type, at least one function for each defined asset type, function to enforce consensus protocol, function to describe block creation, function to enforce fork resolution, and function to describe peer resolution.

By way of example, the primary contact, register of the public keys and permissions and asset types may be registered through a software defined settings menu and the functions provided as Javascript files that provide the appropriate functions that can be executed by the network program 107. The programming language used for programming the network agent/network program is arbitrary and can include any type of language, scripting or otherwise, under the assumption that the used language can be executed on all network devices 102 required to join the network.

The authorisation module 154 of the network program 107 is programmed to authorise incoming peer requests based on user specified security criteria. The security criteria may include built in authorisations through checking user and network device permissions by referring to the public key register and permissions register. Additional custom security criterion may be added through the functions programming. By way of example, the criterion for the consensus protocol and block creation functions may comprise that a set hash rate has not been exceeded. Another criterion may be that a network device 102 has not validated a network update request more than some set number of times within a set timeframe.

By way of another example, the criterion for functions to operate over some digital asset type may comprise that more than one user must have to digitally sign the function before it may be performed. Another criterion may be that there is a cooling off period on some digital asset type to enforce that a digital asset can only be used once in a given time frame.

By way of another example, the criterion for peer resolution may comprise of requiring that peers provided a digitally signed reference to the latest block 210. Another criterion may be that the ID of a peer network device 102 is only valid for a given timeframe. It will be understood that the number and type of criterion may vary depending on the desired implementation and the level of security required for the private network.

It will be understood that the initially configured primary contact network device 102 (i.e. Device A as per the previous example) may not always be the primary contact and that other network devices could be configured to be primary contacts at a later time (i.e. by way of a network update).

As discussed above, digital assets 109 in the network 100 are represented as arbitrary tokens. The tokens may, for example, be associated with storage space that has a particular state. In this instance, during initialisation (or at some later time), the network program 107 on Device A may be programmed to request that each network device 102 that joins the network allocate a particular amount of space (where possible) for storing the digital asset. It will be understood that, upon creation of the network, the state will be zero. Further, the network program 107 may be programmed to provide that individual users can be allocated a particular amount of some type of digital asset, over the network in its entirety.

At step S3, the network agent 106 and network program 107 are installed on each other device 102 that is to form the private network (referenced as "Devices B-Z" in FIG. 6). Key sets for those network devices 102 are also generated and stored in an encrypted form (i.e. for execution in run time). User application interfaces 126 in any particular embodiment are installed on network devices 102 to allow user interaction.

At step S4, the network programs 107 are executed by the respective network agents 106. On execution, the network programs 107 on the non-primary devices B-Z attempt to establish peer relationships, based on peer resolution rules stored by the network program 107 and implemented by the network module 152. As an initial step, the non-primary devices B-Z individually query the physical layer to look for the primary contact Device A. After having connected with the Device A, the consensus modules 158 of the network programs 107 communicate to synchronise the blockchain 200 (which at this point consists of just the root block 202). A block hash of the synchronised blockchain 200 is also stored by the network programs 107 of Devices B-Z, in the same manner as for conventional blockchain systems (i.e. for adding to any newly created blocks 210, which prevents changes being fraudulently made to the blockchain 200 as will be understood by persons skilled in the art).

It will be understood that any number and type of non-primary contact network devices 102 may be added to the private network during the network creation phase.

Figure 7:
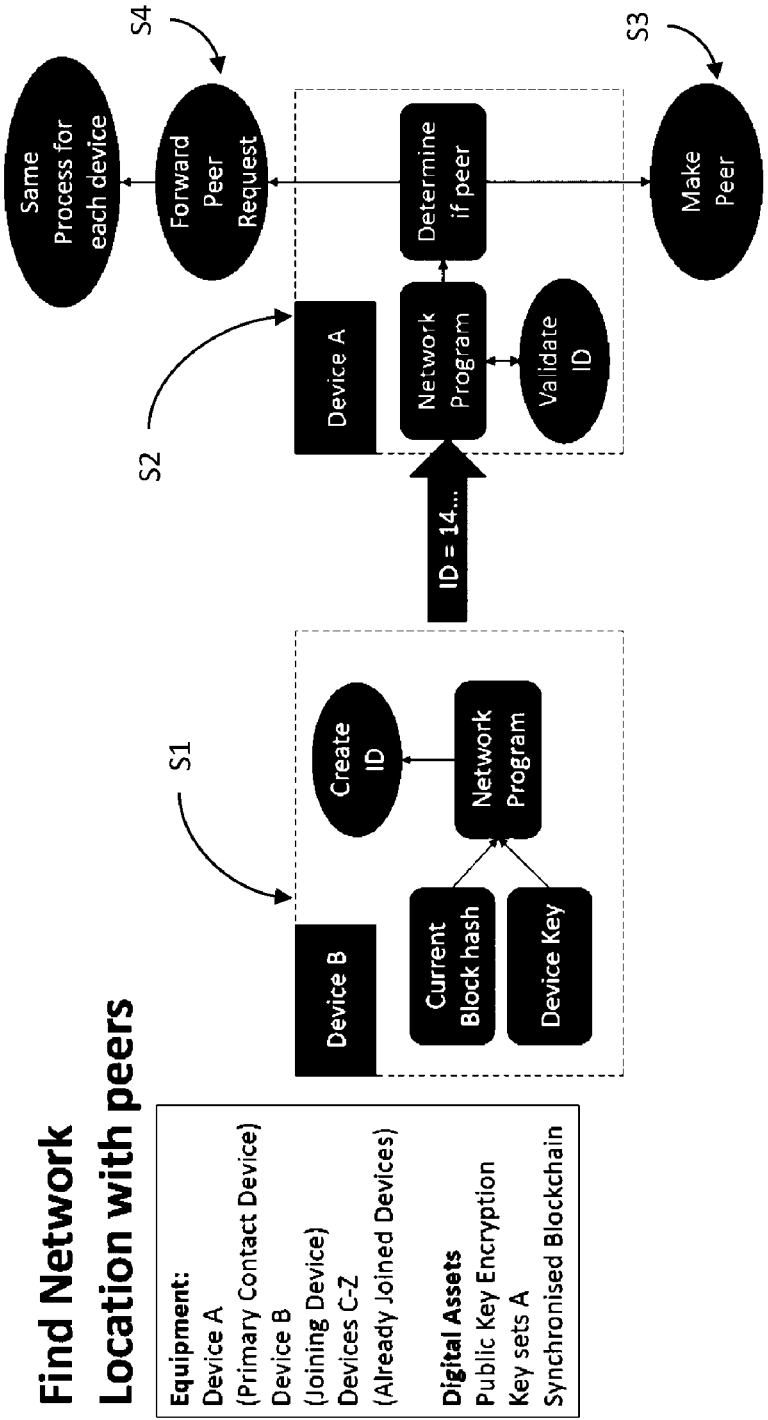
FIGS. 7 and 8 are schematics illustrating an example process for locating network peers, in accordance with an embodiment.
Figure 8:
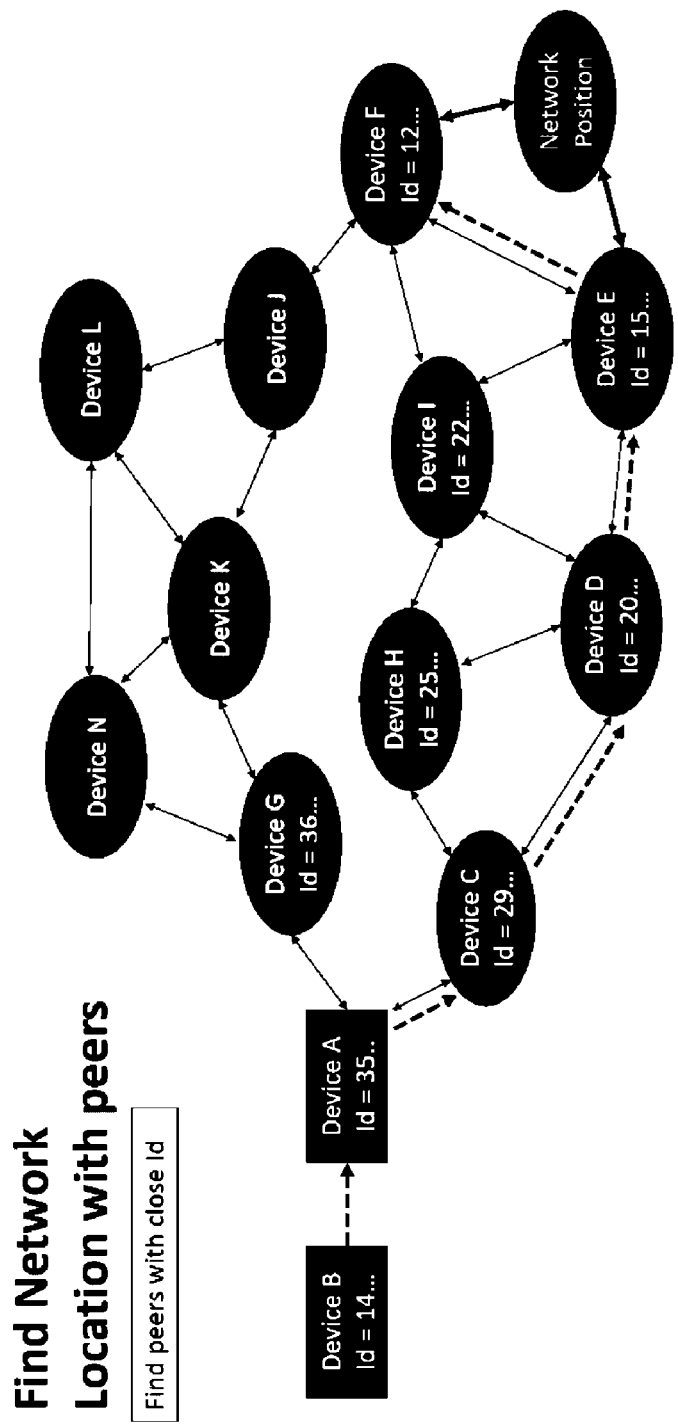

FIGS. 7 and 8 are schematics illustrating an example process for finding a network location with peers. The example assumes Devices A and C-Z have already joined the network 100, with Device B the only remaining device attempting to find its place in the network.

Step S1 of FIG. 7 comprises creating a network identifier in the physical layer. This is facilitated by the network module 152 of the network program 107, which subsequently instructs the Device B to communicate the identifier to Device A in a device-initiated peer request message. The peer request message comprises of the device identifier, information on how to connect to the device 102, a reference to the device's public key, and a digital signature created with the private key corresponding to the device's public key. A peer resolution function implemented by the network module 152 of the network program 107 may require addition parameters to be executed. By way of example, a reference to last created block may also be required for inclusion within the peer request message.

At step S2, the network module 152 of the network program 107 on Device A first determines if the peer request message is valid by executing the peer resolution function. The results of this function will determine if the peer request is valid, and, if valid, whether this peer should be connected to, or whether the request message should be forwarded to other peers. If the network program 107 on Device A establishes Device B should be made a peer, the network module 152 of the network program 107 establishes a connection to the peer (step S3). If not, at step S4, Device A forwards the peer request message to one of its peers (i.e. that Device A has determined to be a peer based on a prior peer determination). The peer computing device(s) repeat the above process until Device B has been made a peer of at least one another network device 102. This is schematically illustrated in FIG. 8.

Network Implementation Phase

Figure 9:
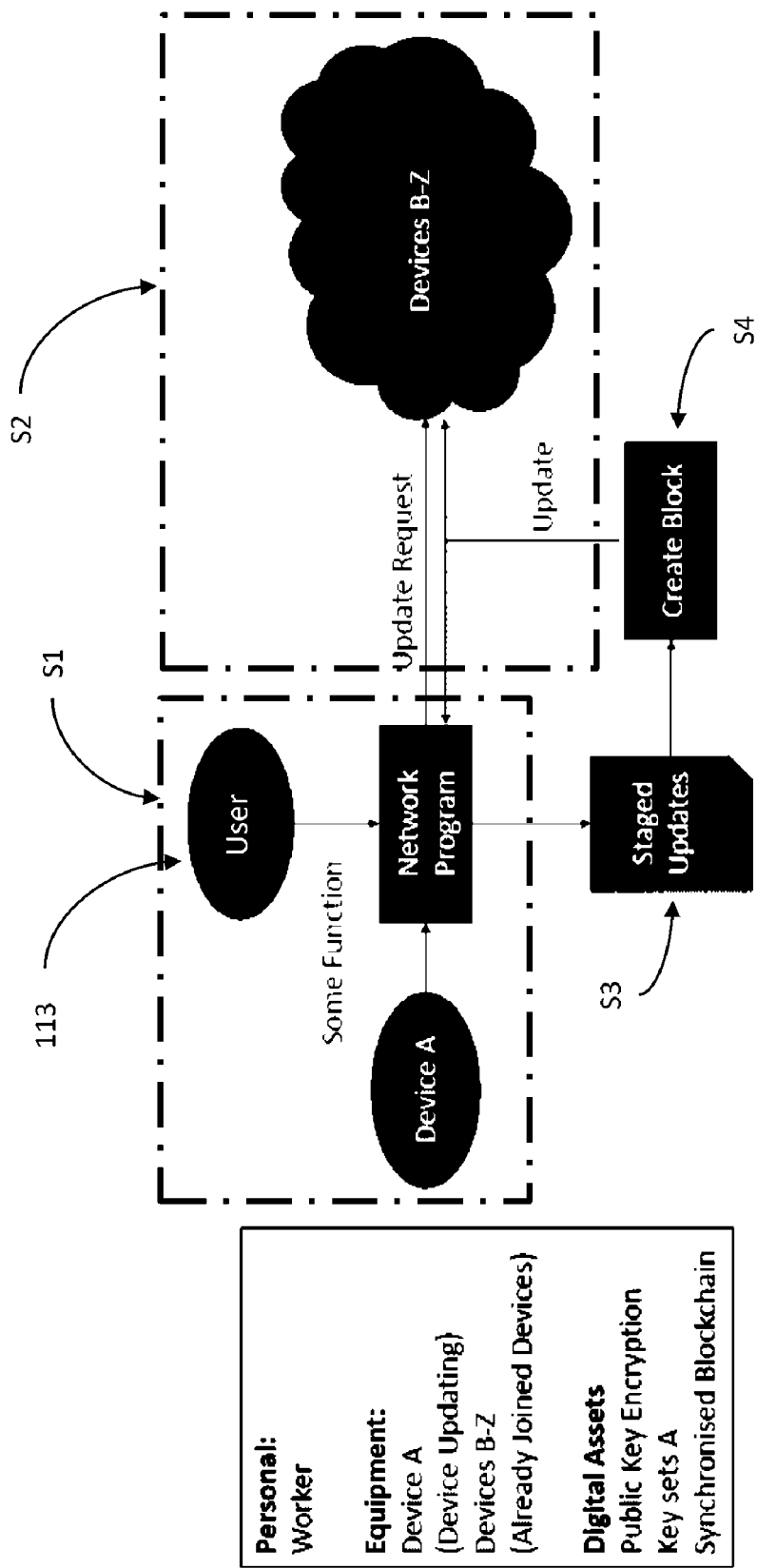
FIG. 9 is a schematic illustrating a process for performing some action on the network, in accordance with an embodiment.

With reference to FIG. 9 there is shown an example schematic illustration of how a user-initiated peer request message may be processed by the network 100.

In an initial step S1, a user 113 generates a peer request message via the user application interface 126 on a network device 102 (in this case Device A).

The peer request message includes a reference to the public key of the user 113, a digital signature created with the private key corresponding to the user's public key, a request to perform some predefined function on a particular digital asset type, and any required parameters for the functions, as required by the rule set defined by the type system rule set 150. The network program 107 on the corresponding network device 102 includes a reference to the device's public key and a digital signature created with the private key corresponding to the devices public key.

At step S2, the peer request message is forwarded to each peer of the requesting network device 102 for processing. The network programs 107 on those devices (selected ones of Devices B to Z as determined by peer rules) subsequently validate the peer request message (step S3). This involves working out whether the various device and user permissions (as stored by the register of permissions for users 113 and devices 102 in the network program 107) have been satisfied. Furthermore, an 'IsAuthorised' section of the requested function may be executed to add additional security criterion (such as those security mechanisms discussed in previous paragraphs), when the normal criterion have been satisfied. If the peer request message is valid and all other security criterion are met, the function is queued to be executed by the confirmation module 156 of the network program 107 and a record of its execution is stored by the corresponding device 102. Furthermore, the peer request message is forwarded to connected peers.

The function executed may, for example, perform some trivial change of state, or require the device 102 to perform some action over the network 100. If an action is required, the device 102 may, for example, check its capabilities and whether it has the required data (e.g. digital asset 109) within the network environment. If able to, the device 102 will perform the requested action. The action may require, for example, one or more of devices B to Z to send data to device A, store some data, or perform some computation over some data and record/send the result. It will be understood that the action can relate to the use of any computational resource.

Example Use Cases

The following describes various non-limiting use cases for networks created according to embodiments described herein.

As a first example use case, a private environment can be created to mirror the functionality of a typical file storage/sharing system hosted by a private network. The private network may be physically implemented over a LAN/WAN, or other suitable physical network configuration.

In a simple example of such an embodiment, three main types 160 may be specified by the network program 107, namely: space, file and view. Space is a value representation of the amount a storage space within the network, and who has ownership over that space. File is the data representation of files in the system. The file type may leverage the structure of the network to store pieces of the data it is representing across the network, giving the security and reliability properties as afore-described. View is an abstract digital asset that represents the notion of retrieving a file. This is a digital asset that is created every time someone views a file and has an associated function that retrieves the data from the structured network. An immutable log of all events to do with the files may thus be created within the blockchain, including every change, transfer of space, change in file permission and every time a file is viewed. Each action is digitally signed by the user who carried out the action and the device used to request the action.

Figure 10:
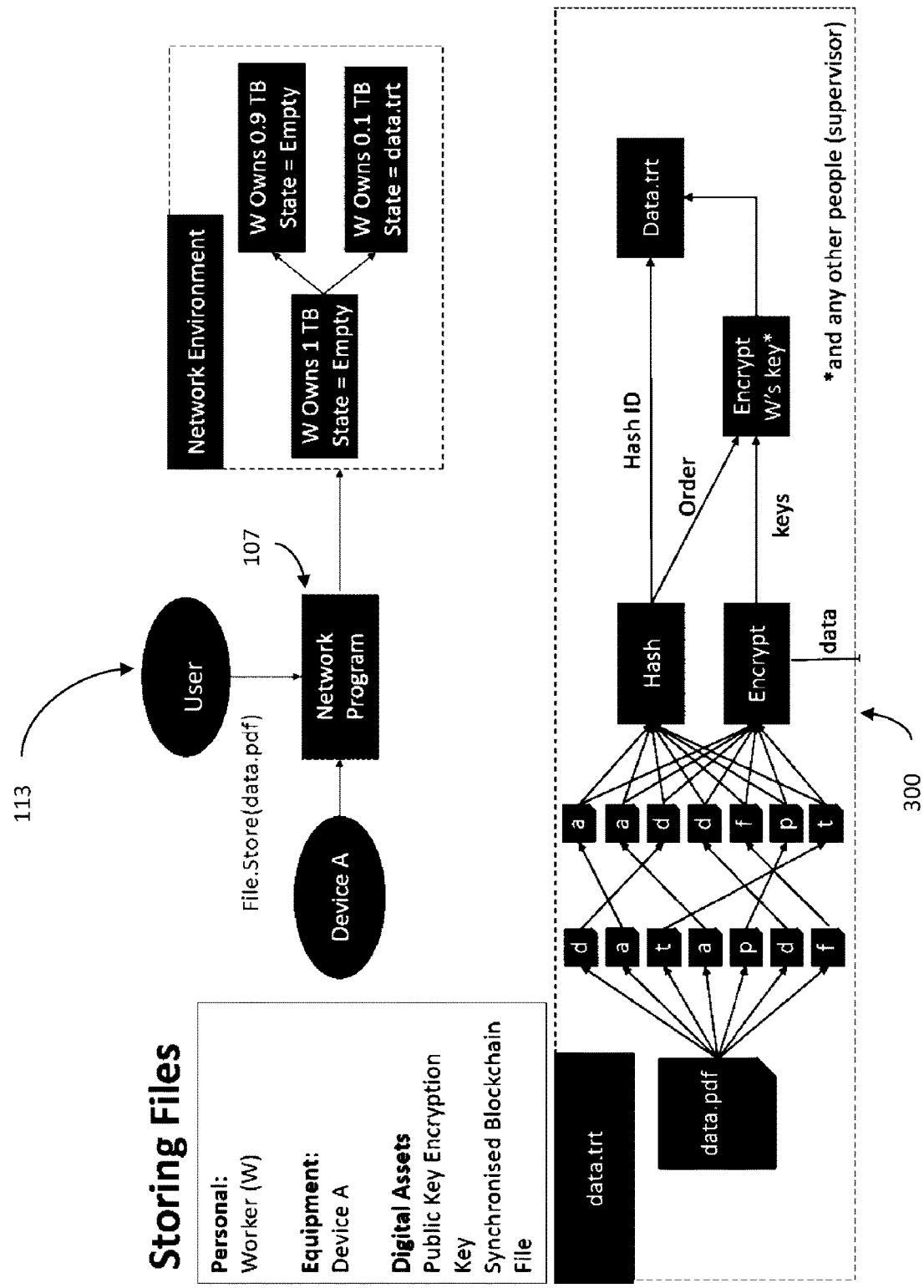
FIGS. 10 and 11 are schematics illustrating a process for storing data represented as a digital asset over a private network, in accordance with an embodiment.
Figure 11:
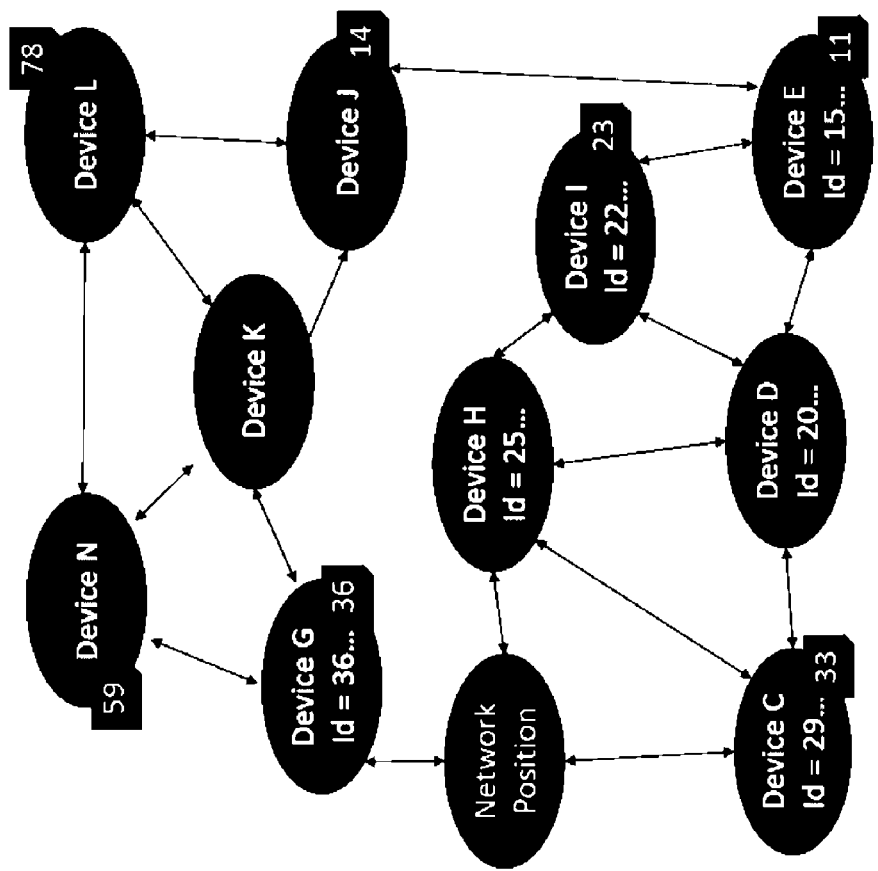
Figure 11:
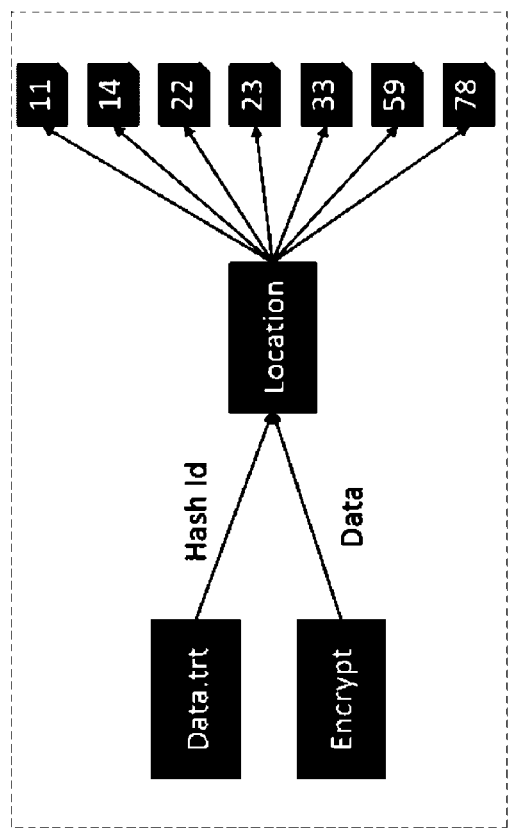

The aforementioned example use case is schematically represented in FIGS. 10 and 11. In this example, the user initiates the store function, on type "file", with the parameter being the file data.pdf (step S1). The store function will describe how the data.pdf is to be represented, stored and secured in the network. A transaction is defined by the store function that represents how the type file owned by the user changes state to now represent data.pdf. Item 300 of FIG. 10 schematically illustrates how a data.trt transaction is created to represent a transaction that indicates the change in state of type file owned by the user 113. As shown, the file data.pdf is fragmented into small pieces of data. These small fragments are shuffled and encrypted. The data.trt transaction comprises of the hash of each file, and the original order of fragments and key used to encrypt the fragments encrypted with the user's key. Device A sends a peer request message requesting that the store function of type file be executed as represented by the data.trt transaction. As shown at the top of FIG. 10, device A sends the encrypted fragments of data.pdf along with the data.trt transaction. The store function will describe how to process the store function when received by peers. In this example, since the function requires the storage of an asset, the peer will query the structured network (in this example DHT network having DHT rules and thus DHT identity) to determine if it is required to store the data or forward the data on to a peer. FIG. 11 shows the final result of the store function.

Figure 12:
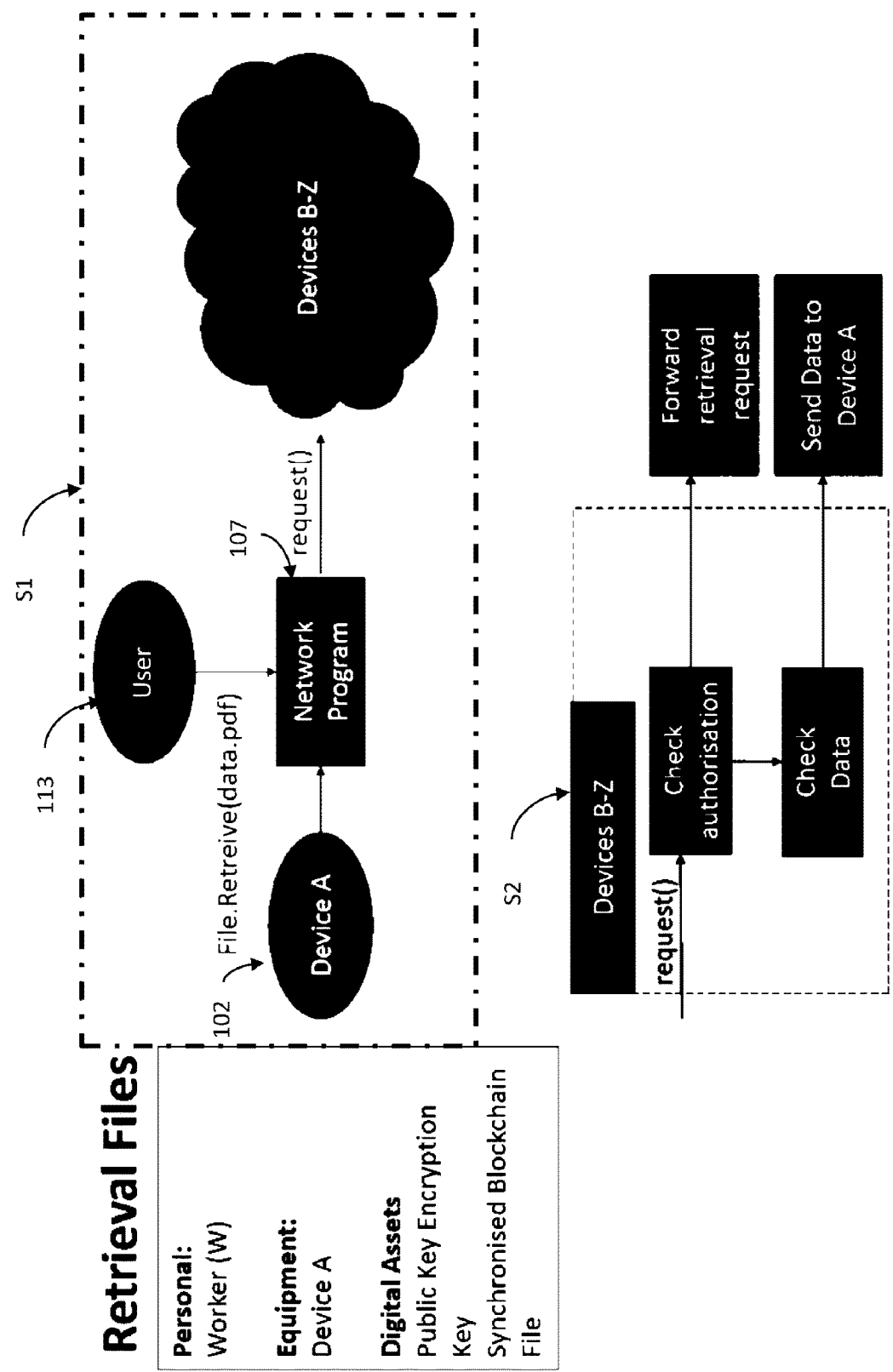
FIGS. 12 and 13 are schematics illustrating a process for retrieving data represented as a digital asset stored as per FIGS. 10 and 11, in accordance with an embodiment.
Figure 13:
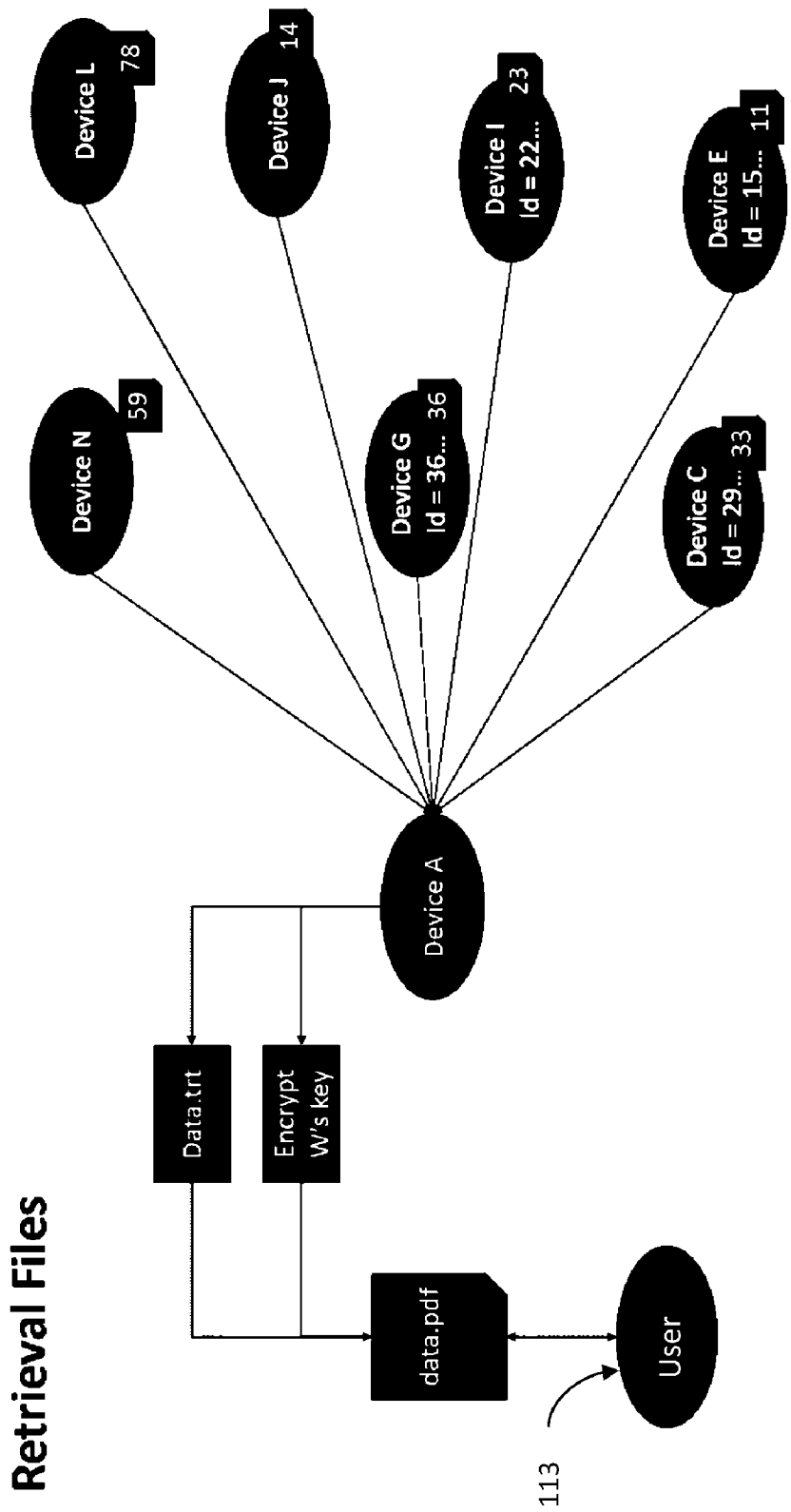

With reference to FIGS. 12 and 13, there process for retrieving the stored data file is schematically represented. In this instance, and with particular reference to FIG. 12, step S1 involves a user (in this case being a user of Device A) requesting that the file data.pdf be retrieved using the retrieve function of type file. A transactional representation of the retrieve function is created by the retrieve function. The state of the type file owned by the user 113 does not change, but the program environment is updated to indicate the file was retrieved. The network program 107 on that network device 102 generates a peer request message, containing the transactional representation of the retrieve function, that is posted on the network 100. When a peer device receives the peer request, and the peer request is valid, the peer's network program will be queued to execute the retrieve function (step S2). The retrieve function will describe how to process the retrieve function when received from a peer. In this example, since the function requires the device to perform an action, sending data to the requesting device, the device will check if it has the available resource to perform that action, if it stores a fragment of data.pdf. If the device has the require resources, it will perform the action, sending the data to the requesting device. This is schematically illustrated in FIG. 13.

Returning to FIG. 12, one or more staged updates may posted resulting through execution of one or more function (step S3). At step S4, one of the peer network devices creates a new block 210 (i.e. that includes transactional representations of the update(s), as previously described). The network device 102 that created the block 210 sends it to its peers for verification. Once the block 210 has been verified it is attached to the blockchain 200 stored by the accepting devices 102 and the network program and/or network environment are updated to reflect changes indicated within the newly added block 210.

A function will be executed based off the corresponding execution rule listed in the network program rule set 150. This rule will specify how many confirmations will be needed before the function is executed. A function will be queued to be executed when received (i.e. by the confirmation module 156) and executed when the rule is satisfied.

As a second example use case, a network as described herein may be configured for outsourcing the process of storing data without compromising security of the data, or trusting a single third party with the confidentiality and integrity of that data.

The network is similarly configured to afore-described use case, however instead of decentralising the network across a private LAN/WAN (or series of private LANs/WANs), it is decentralised across the Internet. A plurality of third-party storage providers, such as cloud providers, are each designated a number of devices 102. Those providers are tasked only with storing an encrypted fraction of random data chunks relative to the number of devices they are given. For example, if the data is evenly split between three cloud providers, each provider would store roughly a random third of all the data chunks. Thus, each provider only has governance over a third of the data. At the minimal level of security, all three providers would need to brake confidentiality/integrity (either by being hacked or through internal malicious behaviour) for the security of the data to be compromised.

As will be appreciated, the more different parties/providers are engaged to store the data, the more secure the system is. Such a network configuration provides a vast amount of security and reliability, on top of the security and reliability already provided by the third-party providers.

As a third example use case, a network can be configured such that use and access of peripheral devices connected thereto can be restricted, controlled and tracked.

As persons skilled in the art will appreciate, networks often contain many peripheral devices. Such peripheral devices are typically ancillary devices used to put information into and/or get information out of computers connected to the network. For example, such peripheral devices may include a keyboard, mouse, printer, credit card reader, POS terminal, cash draw, and the like. The use of these peripheral devices is often untracked and simply require that a user is logged onto the computing device it is connected to in order operate the peripheral. This can lead to problems such as theft, unauthorised use and breaches of data.

As stated above, a network created according to the present invention may be implemented to restrict, control and track all use and access of peripheral devices connected to the network. In this instance, each type of device is represented as a type 160 in the system (i.e. as defined by the network program 107), with each function 162 for that device type representing all the possible uses. The peripheral devices are configured to only accept instructions from the network program 107. This means that all use of any of the peripheral devices added is secured by the network program 107, and every use is tracked and logged by way of network updates, as previously described. Such a network configuration advantageously gives network owners far superior control and security for all peripheral devices in the network.

Yet another example use case is similar to that described above for peripheral devices, but instead the network devices are autonomous and have internal processes that control them. Such autonomous devices include, for example, smart devices (e.g. IoT devices), fitness devices, routers and printers. Instead of an individual computer controlling these devices, they instead operate of their own accord based on internal program code. According to an embodiment of the present invention, an autonomous agent 106 can be embedded into the devices (specifically, implemented by the operating system of the device) to allow them to connect to the network. This allows all control, use and access to the device to be tracked and performed through the network. For example, a wireless router can have the autonomous agent/network program embedded into it, allowing wireless access to be controlled by the network program directly, thereby allowing network owners the ability to customise and secure wireless access and use. Furthermore, this automatic process can be implemented on the physical layer (i.e. incorporated into the device hardware/firmware) for anti-theft, virus protection, and information censoring, which tasks are usually performed by the server on the edge of the network to prevent data breaches. Instead, according to the above embodiment, such tasks can be performed at the source of the communication, irrespective of location in the network.

Still another use case relates to techniques for implementing anti-virus software. As persons skilled in the art will appreciate, implanting anti-virus software relies heavily on a singular source of truth to identify virus's or other malicious software and typically requires a large centralised server to control the anti-virus software when deployed across a large network of devices. Thus, if the source of truth is compromised at the centralised server then the anti-virus is compromised. Embodiments of the present invention can be used to create a de-centralised network for anti-virus software, where the source of truth is de-centralised across all the devices on the network and wherein the control of the network is de-centralised across all the devices. As a simple example, the network program may define three types: The anti-virus software, the anti-virus controller, and the source of truth (e.g. a data asset). The anti-virus software type would have one function: to execute the local anti-virus software. The anti-virus controller type function defines all the possible functions relate to anti-virus software control, and external requests to the anti-virus software, such as scan this file or block this software. The source of truth type contains all the data required for the anti-virus software to operate. The functions for this type would be related to data management. In this system, each device can now collectively work together to find malicious software and stop it spreading. Each operation can be tracked and results of the operations can be recorded (using logging techniques, as afore-described). A network owner/user can control all the anti-virus software from any device connected to the network where everything is tracked. All updates and changes to the source of truth can be tracked. This results in a far more secure, robust and flexible anti-virus deployment and use method.

As a further example use case, an embodiment may be implemented as a retro-fit/phasing out tool. As person skilled in the art will understand, most private networks have systems installed over their networks that solve various problems which have different degrees of success/usability. In many cases, when extending a network or upgrading, the existing system factors greatly in deciding how the new part of the network is implemented. This often results in private networks relying heavily on outdated/legacy systems. A private network implemented in accordance with an embodiment of the present invention allows the retro-fitting of outdated/legacy systems, readily allowing newer/other parts of the network to be upgraded even if two systems are incompatible. As a simplified example, the network program 107 would be programmed such that each type represents a purpose/system (e.g. file storage). Each function represents the possible different uses/actions in the system (e.g. retrieve a file). The function will determine what version/system is installed on the device in question and interface with that system to achieve the use/action. For example, two databases may use two different methods for storing the files, with different sets of actions required to retrieve the file (e.g. different encryption methods). When a device receives a function that instructs it to retrieve a file, it can determine what method was used for that device and the set of actions required. This means that the exact implementation/method used for any system is hidden to the users, and it will feel like the user is interfacing with a single system, instead of separate systems that operate differently. Thus, methods can be used to upgrade parts of the private network and use different techniques/tools depending on what device it is operating on.

Embodiments can also be used as a system orchestration tool. Persons skilled in the art will appreciate that most private networks have a plethora of software and hardware systems running in conjunction. This can include, for example, servers, printers, CRM's, databases, accounting software, among many others. These systems are often developed by different third parties that use disparate techniques for interfacing and controlling the software/hardware. A private network created in accordance with an embodiment of the present invention can be used to create a uniform interface and controller to all systems running over a network. Each type within the network program can represent different systems on the network with all functions describing various interfaces to that system. Each function is specified to execute on the device that is hosting/can reach the system in question and use an API/RPC/REST or other method to interface with it. This allows an authorised user to use any authorised device to control/use/configure any system. This can extend to each system being a user of the network, using the private network to control/use/configure other systems. This provides vast amounts of flexibility and security to the system. The control/use/configuration of a system is thus no longer restricted to an interface directly connected to the system but can be done from any authorised device on the network. Custom and secure access control can be built on a layer outside the systems in questions, thereby allowing the owners to easily conform to the relevant standards and policy and not be restricted by what a specific system allows. All control/use/configuration of any of the systems is logged and digitally signed allowing far greater auditing and tracking of users than for conventional systems.

It will be understood from the above use cases that the initial network program 107 and network state 163/208 must be distributed to all devices 102 required to join the network. This is also the case for any type-based/programmatic system where a type system/program must installed on every device. It is possible that implementation details of the network program and network state could undermine the security of the system. Thus, depending on the implementation, it may be desirable for this information to be treated as secret and not open to attack. This is particularly the case when devices are spread out over public networks, such as the Internet.

As a further use case, the invention may be implemented as a meta-network. In contrast to preceding examples where the types and functions are defined from the outset (i.e. to match the desired use case), the meta-network implementation is instead configured to a system that is used as an environment for building/creating other use cases. This is deployed on all devices with the meta-network implementation information allowed to be public knowledge without revealing any details about the actual implementation. Using the security mechanisms given by the private network, the desired use case can be then installed/created securely across all devices. Due to the synchronising ability of the private network, devices can join the meta network at any time, including after this use case system has been created to install the real use case.

The various aspects discussed herein may be implemented via any appropriate number and/or type of computer platform, modules, processors, memory, etc. each of which may be embodied in hardware, software, firmware, middleware and the like.

Further, it will be understood that the term "processor" as used herein is to be construed broadly and include within its scope any device that can process the relevant data/messages and may include a microprocessor, microcontroller, programmable logic device or other computational device, a general-purpose computer, or a server computer.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method for implementing a computer network, comprising:
    storing a network program as program code in a root block of a blockchain, the network program defining:
        (a) one or more rules for creating a structured network of network devices, each network device implementing an autonomous network agent for executing the network program;
        (b) one or more permissible digital asset types; and
        (c) one or more functions that can be performed on the permissible digital asset types; and
    executing the network program by the autonomous network agent on each network device to implement the computer network; and
        allowing an authorised user to call a function for modifying the network program via any one of the network devices and wherein, responsive to a consensus being reached among the network devices, the modification is applied and an updated version of the network program is stored by the blockchain for synchronisation among the network devices.

2. A method in accordance with claim 1, wherein configuring the network comprises initially executing the network program by an authorised one of the network devices, thereby causing the blockchain to be distributed to each of the other network devices.

3. A method in accordance with claim 2, wherein, once a network device has received the blockchain, the corresponding autonomous agent structures the network device within the network in accordance with the one or more rules.

4. A method in accordance with claim 1, wherein the blockchain is implemented by the network devices to validate device and/or user-initiated requests placed over the network and received by the corresponding network agent.

5. A method in accordance with claim 4, wherein the network program defines one or more permissions that need to be satisfied as part of the validation.

6. A method in accordance with claim 4, wherein, in response to a network request being validated, the method further comprising updating the network.

7. A method in accordance with claim 6, wherein updating the network comprises adding a new block to the blockchain that is representative of at least one request that has been validated.

8. A system for implementing a private computer network over which digital assets can be securely managed, the system comprising:

a plurality of network devices that are communicable over a digital communications medium, each of the network devices implementing an autonomous network agent that is operable to execute a network program that is embodied as program code in a blockchain that is stored and synchronised by the respective network devices for implementing the network, and wherein an initial version of the network program is stored in a root block of the blockchain and defines: (a) one or more rules for creating a structured network of the network devices; (b) one or more permissible digital asset types; and (c) one or more functions that can be performed on the permissible digital asset types, wherein the autonomous network agent is configured to allow an authorised user to call a function for modifying the network program via any one of the network devices and wherein, responsive to a consensus being reached among the autonomous network agents, the modification is applied and an updated version of the network program is stored by the blockchain for synchronisation among the network devices.

9. A system in accordance with claim 8, wherein the network devices are operable to post a peer request message over the network which includes a request to perform a function on a particular digital asset type and wherein the network program on at least one peer network device automatically evaluates the network environment contained within the blockchain to establish whether the requested function is permissible for the particular digital asset type.

10. A system in accordance with claim 9, wherein the network program on the at least one peer network device is further programmed to check that all appreciate authorisations for the request function have been satisfied.

11. A system in accordance with claim 9, wherein, provided the request function is permissible and the appreciate authorisations have been satisfied, the at least one peer network device either executes the function or forwards the peer request message to a peer of that device, depending on whether the requested function can be performed by the at least one peer device.

12. A non-transitory computer readable medium storing a program causing a computer to execute a software agent, the software agent in turn being operable to execute a network program that is embodied as program code in a blockchain that is stored and synchronised by the respective network devices, an initial version of the network program being stored in a root block of the blockchain and wherein the network program defines permissible network defined digital asset types and corresponding functions, as well as one or more rules for creating a structured network of the network devices, wherein the autonomous network agent is configured to allow an authorised user to call a function for modifying the network program via any one of the network devices and wherein, responsive to a consensus being reached among the autonomous network agents, the modification is applied and an updated version of the network program is stored by the blockchain for synchronisation among the network devices.

* * * * *